(12) United States Patent
Kwak et al.

(10) Patent No.: US 7,670,713 B2
(45) Date of Patent: Mar. 2, 2010

(54) FUEL CELL ELECTRODE AND MEMBRANE-ELECTRODE ASSEMBLY AND FUEL CELL SYSTEM

(75) Inventors: Chan Kwak, Suwon-si (KR); Hee-Tak Kim, Suwon-si (KR); Myoung-Ki Min, Suwon-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1148 days.

(21) Appl. No.: 11/269,874

(22) Filed: Nov. 9, 2005

(65) Prior Publication Data

US 2006/0099489 A1 May 11, 2006

(30) Foreign Application Priority Data

Nov. 9, 2004 (KR) ............... 10-2004-0090842

(51) Int. Cl.
*H01M 4/00* (2006.01)
(52) U.S. Cl. ............................. 429/44; 429/40
(58) Field of Classification Search ............ 429/40, 429/44
See application file for complete search history.

(56) References Cited

U.S. PATENT DOCUMENTS

| 4,954,474 A | * | 9/1990 | Tsurumi et al. | 502/185 |
| 5,225,391 A | * | 7/1993 | Stonehart et al. | 502/324 |
| 5,767,036 A | * | 6/1998 | Freund et al. | 502/185 |
| 6,284,402 B1 | * | 9/2001 | Mallouk et al. | 429/40 |

FOREIGN PATENT DOCUMENTS

| JP | 11-347414 A | 12/1999 |
| JP | 2002-343403 A | 11/2002 |
| JP | 2003-502827 A | 1/2003 |

* cited by examiner

*Primary Examiner*—Tracy Dove
(74) *Attorney, Agent, or Firm*—Robert E. Bushnell, Esq.

(57) ABSTRACT

A fuel cell electrode includes a catalyst layer and an electrode substrate supporting the catalyst layer and including a conductive substrate. The catalyst layer includes a first catalyst supported on a carbon supporter and a second catalyst supported on an inorganic oxide supporter. The first catalyst includes an alloy of Pt and a metal selected from the group consisting of Co, Ni, and a mixture thereof, and the second catalyst includes an alloy of Pt and a metal selected from the group consisting of Co, Ni, and a mixture thereof.

10 Claims, 2 Drawing Sheets

FUEL CELL ELECTRODE AND MEMBRANE-ELECTRODE ASSEMBLY AND FUEL CELL SYSTEM

CLAIM OF PRIORITY

This application makes reference to, incorporates the same herein, and claims all benefits accruing under 35 U.S.C. §119 from an application for ELECTRODE FOR FUEL CELL AND MEMBRANE-ELECTRODE ASSEMBLY AND FUEL CELL SYSTEM COMPRISING SAME earlier filed in the Korean Intellectual Property Office on 9 Nov. 2004 and there duly assigned Serial No. 10-2004-0090842.

BACKGROUND OF THE INVENTION

1. Field of the Invention

The present invention relates to a fuel cell electrode, and a membrane-electrode assembly and a fuel cell system including the electrode. More particularly, the present invention relates to a fuel cell electrode for improving a fuel cell life-span by preventing catalyst poisoning, and a membrane-electrode assembly and a fuel cell system including the electrode.

2. Description of the Related Art

A fuel cell is an electrical power generation system that converts chemical energy into electrical energy based on an electrochemical reaction between hydrogen and oxygen in a hydrocarbon-based material such as methanol, ethanol, natural gas, and the like.

Depending on the kind of electrolyte, fuel cells are divided into Phosphoric Acid Fuel Cells (PAFCs), Molten Carbonate Fuel Cells (MCFCs), Solid Oxide Fuel Cells (SOFCs), Proton Exchange Membrane Fuel Cells (PEMFCs), and Alkaline Fuel Cells (AFCs). The fuel cells fundamentally operate on the same principle, but the kinds of fuel, operating temperature, catalyst, and electrolyte are different.

Among the fuel cells, the Polymer Electrolyte Membrane Fuel Cell (PEMFC), which has recently been developed, has excellent output characteristics and fast starting and response characteristics, as well as a low operating temperature, compared to other types of fuel cells. It also has an advantage in that it has wide applications including a distributed power source for houses and public buildings, and a small power source for electronic devices as well as for a transportable power source for a car.

The PEMFC requires a fuel cell body called a stack, which will be referred to as a stack hereinafter for the sake of convenience, and a fuel tank and a fuel pump for supplying fuel from the fuel tank to the stack. It further requires a reformer for generating hydrogen by reforming the fuel while supplying the fuel stored in the fuel tank to the stack and supplying the hydrogen to the stack. The PEMFC generates electrical energy by supplying the fuel stored in the fuel tank to the reformer owing to the pumping power of the fuel pump, generating hydrogen gas through the fuel reformation in the reformer, and causing the hydrogen gas to be oxidized and oxygen to be reduced electrochemically in the stack.

The fuel cell can adopt a Direct Oxidation Fuel Cell (DOFC) scheme to directly supply liquid-phase methanol fuel to the stack. The fuel cell of the DOFC scheme does not require the reformer, which is different from the PEMFC.

In the above fuel cell system, the stack that generates electricity includes several to scores of unit cells stacked in multi-layers, and each unit cell is formed of a Membrane-Electrode Assembly (MEA) and a separator (also collectively referred to as a bipolar plate). The MEA has an anode (fuel electrode or oxidation electrode) and a cathode (air electrode or reduction electrode) attached together with an electrolyte membrane between them. The separator performs a role of a path for supplying hydrogen gas and oxygen, which are required for the reaction of the fuel cell, and a role of a conductor connecting the anode and cathode of the membrane-electrode assembly serially. Through the separator, hydrogen gas is supplied to the anode, whereas oxygen is supplied to the cathode. During the process, the hydrogen gas goes through an electrochemical oxidation reaction at the anode, and the oxygen goes through an electrochemical reduction reaction at the cathode. Due to the transfer of electrons during the reactions, electricity is obtained along with heat and water.

During the fuel cell operation, carbon monoxide (CO) is generated as a by-product and the life-span of the fuel cell is deteriorated due to catalyst poisoning by the carbon monoxide.

SUMMARY OF THE INVENTION

In one embodiment of the present invention, a fuel cell electrode is provided which prevents catalyst poisoning and thus improves the life-span of a fuel cell.

In another embodiment of the present invention, a fuel cell system is provided which includes the electrode.

According to one embodiment of the present invention, a fuel cell electrode is provided, the electrode including: a catalyst layer; and an electrode substrate supporting the catalyst layer and including a conductive substrate, the catalyst layer including: a first catalyst supported on a carbon supporter, the first catalyst including an alloy of Pt and a metal selected from the group consisting of Co, Ni, and a mixture thereof, and a second catalyst supported on an inorganic oxide supporter, the second catalyst including an alloy of Pt and a metal selected from the group consisting of Co, Ni, and a mixture thereof.

The Pt and the metal are preferably present in a weight ratio ranging from 1:0.1 to 1:0.5.

The first catalyst and the second catalyst are preferably present in a weight ratio ranging from 1:0.1 to 1:0.5.

The inorganic oxide supporter preferably includes at least one oxide selected from the group consisting of Al oxide, Si oxide, Zr oxide and Ti oxide.

The electrode is preferably an anode.

According to another embodiment of the present invention, a membrane-electrode assembly is provided including: a polymer electrolyte membrane; and a cathode and an anode respectively arranged on either side of the polymer electrolyte membrane, the cathode and anode including: a catalyst layer, the catalyst layer including: a first catalyst supported on carbon supporter, the first catalyst including an alloy of Pt and a metal selected from the group consisting of Co, Ni, and a mixture thereof; and a second catalyst supported on an inorganic oxide supporter, the second catalyst including an alloy of Pt and a metal selected from the group consisting of Co, Ni, and a mixture thereof; and an electrode substrate including a conductive substrate, the electrode substrate arranged on a side of the catalyst layer not contacting the polymer electrolyte membrane.

The Pt and the metal are preferably present in a weight ratio ranging from 1:0.1 to 1:0.5.

The first catalyst and the second catalyst are preferably present in a weight ratio ranging from 1:0.1 to 1:0.5.

The inorganic oxide supporter preferably includes at least one oxide selected from the group consisting of Al oxide, Si oxide, Zr oxide and Ti oxide.

According to still another embodiment of the present invention, a fuel cell system is provided including: at least one electricity generating element adapted to generate electricity through oxidation of hydrogen or a fuel and reduction of an oxidant, the at least one electricity generating element including: a membrane-electrode assembly including: a polymer electrolyte membrane; and a cathode and an anode respectively arranged on either side of the polymer electrolyte membrane, the cathode and anode including: a catalyst layer, the catalyst layer including: a first catalyst supported on carbon supporter, the first catalyst including an alloy of Pt and a metal selected from the group consisting of Co, Ni, and a mixture thereof; and a second catalyst supported on an inorganic oxide supporter, the second catalyst including an alloy of Pt and a metal selected from the group consisting of Co, Ni, and a mixture thereof; and an electrode substrate including a conductive substrate, the electrode substrate arranged on a side of the catalyst layer not contacting the polymer electrolyte membrane; a fuel supplier adapted to supply hydrogen or a fuel to the at least one electricity generating element; and an oxidant supplier adapted to supply an oxidant to the at least one electricity generating element.

The Pt and the metal are preferably present in a weight ratio ranging from 1:0.1 to 1:0.5.

The first catalyst and the second catalyst are preferably present in a weight ratio ranging from 1:0.1 to 1:0.5.

The inorganic oxide supporter preferably includes at least one oxide selected from the group consisting of Al oxide, Si oxide, Zr oxide and Ti oxide.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
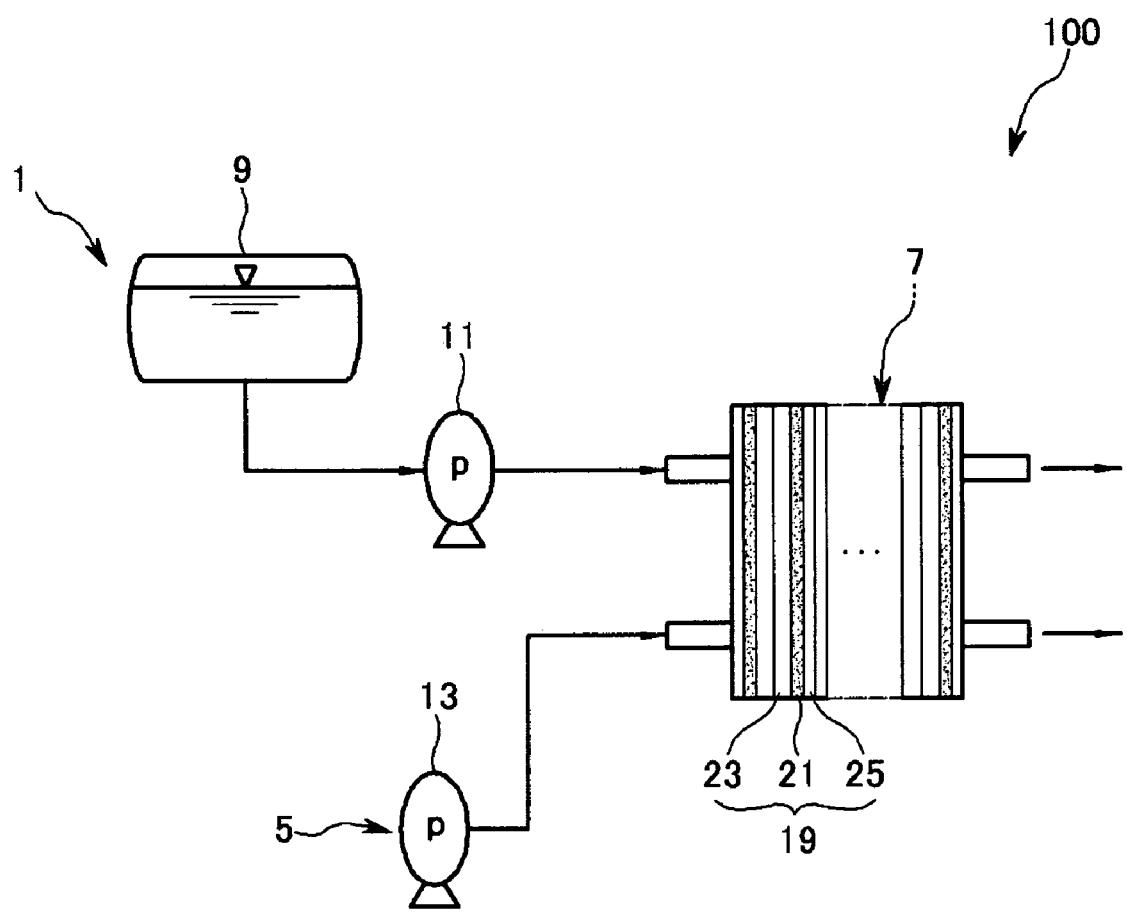
FIG. 1 is a view of a structure of a fuel cell system according to the present invention.

An embodiment of the present invention will hereinafter be described in detail with reference to the accompanying drawings.

The present invention relates to a fuel cell electrode for reducing the deterioration of the life-span of a fuel cell which results from catalyst poisoning by carbon monoxide (CO) generated as a by-product, during the fuel cell operation.

An electrode for a fuel cell of the present invention includes a catalyst layer and an electrode substrate.

The catalyst layer includes a first catalyst which is supported on a carbon carrier and a second catalyst which is supported on an inorganic oxide carrier. The first catalyst includes an alloy of Pt and a metal selected from the group consisting of Co, Ni, and a mixture thereof, and the second catalyst includes an alloy of Pt and a metal selected from the group consisting of Co, Ni, and a mixture thereof.

A second catalyst which is supported on an inorganic oxide carrier has a preferential oxidation reaction for CO, so that it prevents catalyst poisoning by CO and thus improves the life-span of the fuel cell.

It is preferable that the mixture ratio of the Pt and the metal on the first and the second catalysts is in a weight ratio ranging from 1:0.1 to 1:0.5, and more preferably 1:0.4 to 1:0.5.

When the range of the mixture ratio of the metal is under the minimum weight ratio, its performance decreases because interaction between the metal and platinum is insufficient. On the contrary, when the content of the metal is greater than the maximum weight ratio, the effect does not further increase any more as its content increases.

It is preferable that the first catalyst and the second catalyst are present in a weight ratio ranging from 1:0.02 to 1:0.4, more preferably 1:0.02 to 1:02, and still more preferably 1:0.05 to 1:0.1. When the ratio of the second catalyst is under the minimum weight ratio, the performance of the preferential oxidation catalyst is not realized well, and when the ratio of the second catalyst is greater than the maximum weight ratio, electro-conductivity decreases so that electrode performance decreases.

Acetylene black, graphite, Vulcan, an activated carbon, carbon nano-tubes, carbon nano-fibers, carbon nano-wires, carbon nano-horns, or carbon nano-rings are used as a carbon carrier. However, the present invention is not limited thereto.

Al oxide, Si oxide, Zr oxide, or Ti oxide is used as the inorganic oxide carrier. However, the present invention is not limited thereto.

The first catalyst in the catalyst for a fuel cell of the present invention is prepared as follows: a mixture of a platinum-containing source, a cobalt-containing source, and a nickel-containing source are added to the solvent and mixed to obtain a solution, carrier particles are dipped into the solution, and the dipped carrier particles are dried and reduced under hydrogen gas. Alternatively, the platinum is firstly supported on a carrier, and the platinum supported on the carrier is dipped in a solution which includes a cobalt-containing source and a nickel-containing source separately or together. The platinum supported on the carrier is thus covered with cobalt and nickel, and it is then heated under a hydrogen atmosphere.

The platinum-containing source includes chloroplatinate or tetraamonium platinum nitrate. However, the present invention is not limited thereto.

The cobalt-containing source includes cobalt nitrate or cobalt acetate. However, the present invention is not limited thereto.

The nickel-containing source includes nickel nitrate or nickel acetate. However, the present invention is not limited thereto.

The solvent includes water or alcohol such as methanol, ethanol, and isopropanol. However, the present invention is not limited thereto.

The second catalyst is prepared by the same method as for the first catalyst, except that an inorganic oxide carrier is used as the carrier instead of carbon.

In accordance with the present invention, when preparing the first catalyst and the second catalyst, a Na-metal salt can be added in the carrier to regulate the carrier to have its basic property and render alloying to be carried out easily.

Subsequently, the catalyst of the invention is prepared by mixing the first and the second catalysts. It is preferable that the first catalyst and the second catalyst are present in a weight ratio ranging from 1:0.02 to 1:0.4, more preferably 1:0.02 to 1:0.2, and still more preferably 1:0.05 to 1:0.1.

When the ratio of the second catalyst is below the minimum weight ratio, the performance of the preferential oxidation catalyst is not good. On the contrary, when the ratio of the second catalyst is greater than the maximum weight ratio, electro-conductivity of the catalyst decreases, so that performance of the electrode decreases.

According to another embodiment, the first catalyst and the second catalyst are prepared by using a mixture of carbon carrier and inorganic oxide carrier. A platinum-containing source, a cobalt-containing source, and a nickel-containing source are added to the solvent to obtain a solution. The mixed carrier including the carbon carrier and inorganic oxide carrier is dipped in the solution, and the dipped carrier is dried and reduced under hydrogen gas. Alternatively, the platinum is firstly supported on the mixed carrier, and the platinum supported on the mixed carrier is dipped in a solution which includes a cobalt-containing source and a nickel-containing source separately or together. The platinum supported on the mixed carrier is thus covered with cobalt and nickel, and it is then heated under a hydrogen atmosphere.

A membrane-electrode assembly for a fuel cell including the electrode of the present invention includes a polymer electrolyte membrane and a cathode and an anode positioned on either side of the polymer electrolyte membrane. It is preferable that the electrode of the present invention is the anode in the membrane-electrode assembly.

The polymer electrolyte membrane includes a proton-conductive polymer. The proton conductive polymer can be any polymer resin having a cation exchange group selected from the group consisting of a sulfonic acid group, a carboxylic acid group, a phosphoric acid group, a phosphonic acid group, and derivatives thereof at its side chain.

The proton-conducting polymer can be selected from the group consisting of perfluoro-based polymers, benzimidazole-based polymers, polyether-based polymers, polyimide-based polymers, polyetherimide-based polymers, polyamide-based polymer, polyphenylene sulfide-based polymers, polysulfone-based polymers, polyethersulfone-based polymers, polyetherketone-based polymers, polyether-etherketone-based polymers, and polyphenylquinoxaline-based polymers. In an exemplary embodiment, at least one proton-conducting polymer can include but is not limited to a polymer selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, aryl ketones, poly(2,2'-(m-phenylene)-5,5'-bibenzimidazole), and poly(2,5-benzimidazole). According to the present invention, a proton-conducting polymer included in a polymer electrolyte membrane for a fuel cell is not limited to these polymers. The polymer membrane has a thickness ranging from 10 to 200 μm.

According to another embodiment of the present invention, the fuel cell system includes at least one electricity generating element which generates electricity through an electrochemical reaction of hydrogen and oxygen, and includes the above membrane-electrode assembly and separators positioned on either side of the membrane-electrode assembly, a fuel supplier, and an oxidant supplier.

The fuel supplier supplies a fuel to the electricity generating element, and the oxidant supplier supplies an oxidant to the electricity generating element. The fuel is a hydrocarbon-based material such as methanol, ethanol, natural gas, and the like, and examples of the oxidant are air and oxygen.

FIG. 1 is a view of a fuel cell system of the present invention, which is described in more detail as follows.

The fuel cell system 100 of the present invention includes a stack 7 including at least one electricity generating element 19 which generates electricity through an electrochemical reaction of a fuel and an oxidant, a fuel supplier 1, and an oxidant supplier 5.

Furthermore, the fuel supplier 1 supplying the fuel includes a fuel tank 9 which stores fuel, and a fuel pump 11 which connects to the fuel tank 9. The fuel pump 11 transfers fuel stored in the fuel tank 9.

The oxygen supplier 5 supplying the oxidant to the electricity generating element 19 of the stack 7 comprises at least one air pump 13, which draws air.

The electricity generating element 19 includes a membrane-electrode assembly 21 which performs an oxidation/reduction reaction of the fuel and oxidant, and separators 23 and 25 which are positioned on either side of the membrane-electrode assembly to supply the fuel and oxidant.

The following examples illustrate the present invention in further detail. However, it is understood that the present invention is not limited to these examples.

EXAMPLE 1

Chloroplatinate and cobalt nitrate were mixed in a ratio of Pt and Co ranging from 1:0.5 in water to obtain a mixture. The resulting mixture was supported on an alumina carrier, dried, and then fired at 500° C. to prepare a second catalyst. A catalyst slurry was prepared by mixing the second catalyst and a first catalyst where Pt was supported on the carbon carrier, in a weight ratio ranging from 1:0.40, with a polytetrafluoroethylene polymer and a mixed solvent of isopropyl alcohol. An electrode for a fuel cell was prepared by coating the catalyst slurry on an electrode substrate of a glass carbon substrate.

Comparative Example 1

An electrode for a fuel cell was fabricated by the same method as in Example 1, except that a catalyst where Pt was supported on the carbon carrier in a weight ratio ranging from 1:0.5 was used.

The electrodes fabricated in Example 1 and Comparative Example 1 were tested using a rotating disk electrode. Electrochemical measurements were performed in a three electrode-one compartment glass cell. The counter electrode was a platinum foil and the reference electrode was Ag/AgCl. Methanol was added to a 0.5 M H2SO4 electrolyte to artificially produce carbon monoxide. The current density was measured at 0.6 V (SHE) with time and the measurement results shown in FIG. 2.

Figure 2:
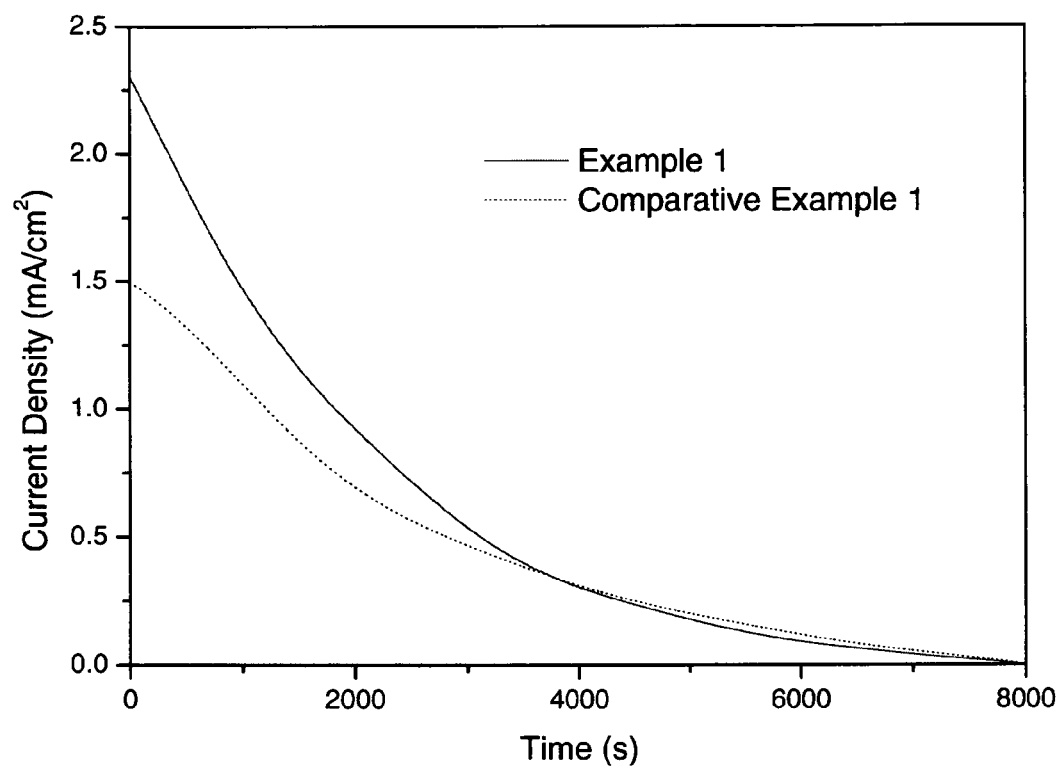
FIG. 2 is a graph of measured current using Rotating Disk Electrodes (RDEs) according to Example 1 and Comparative Example 1.

As shown in FIG. 2, the fuel cell electrode according to Example 1 of the present invention shows an improved performance over that of Comparative Example 1, since the CO bound to the catalyst is easily detached from the catalyst during operation of the fuel cell.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A fuel cell electrode, comprising:
   a catalyst layer; and
   an electrode substrate supporting the catalyst layer and including a conductive substrate, the catalyst layer including:
   a first catalyst supported on a carbon supporter, the first catalyst including an alloy of Pt and a metal selected from the group consisting of Co, Ni, and a mixture thereof, and a second catalyst supported on an inorganic oxide supporter, the second catalyst including an alloy of Pt and a metal selected from the group consisting of Co, Ni, and a mixture thereof, wherein the first catalyst and the second catalyst are present in a weight ratio ranging from 1:0.02 to 1:0.4.

2. The electrode of claim 1, wherein the Pt and the metal of the first and second catalyst are present in a weight ratio ranging from 1:0.1 to 1:0.5.

3. The electrode of claim 1, wherein the inorganic oxide supporter comprises at least one oxide selected from the group consisting of Al oxide, Si oxide, Zr oxide and Ti oxide.

4. The electrode of claim 1 comprises an anode.

5. A membrane-electrode assembly comprising:

a polymer electrolyte membrane; and a cathode and an anode respectively arranged on either side of the polymer electrolyte membrane, the cathode and anode including:

a catalyst layer, the catalyst layer including:

a first catalyst supported on carbon supporter, the first catalyst including an alloy of Pt and a metal selected from the group consisting of Co, Ni, and a mixture thereof; and a second catalyst supported on an inorganic oxide supporter, the second catalyst including an alloy of Pt and a metal selected from the group consisting of Co, Ni, and a mixture thereof; and an electrode substrate including a conductive substrate, the electrode substrate arranged on a side of the catalyst layer not contacting the polymer electrolyte membrane, wherein the first catalyst and the second catalyst are present in a weight ratio ranging from 1:0.02 to 1:0.4.

6. The membrane-electrode assembly of claim 5, wherein the Pt and the metal of the first and second catalyst are present in a weight ratio ranging from 1:0.1 to 1:0.5.

7. The membrane-electrode assembly of claim 5, wherein the inorganic oxide supporter comprises at least one oxide selected from the group consisting of Al oxide, Si oxide, Zr oxide and Ti oxide.

8. A fuel cell system, comprising:

at least one electricity generating element adapted to generate electricity through oxidation of hydrogen or a fuel and reduction of an oxidant, the at least one electricity generating element including:

a membrane-electrode assembly including:

a polymer electrolyte membrane; and a cathode and an anode respectively arranged on either side of the polymer electrolyte membrane, the cathode and anode including:

a catalyst layer, the catalyst layer including:

a first catalyst supported on carbon supporter, the first catalyst including an alloy of Pt and a metal selected from the group consisting of Co, Ni, and a mixture thereof; and a second catalyst supported on an inorganic oxide supporter, the second catalyst including an alloy of Pt and a metal selected from the group consisting of Co, Ni, and a mixture thereof; and an electrode substrate including a conductive substrate, the electrode substrate arranged on a side of the catalyst layer not contacting the polymer electrolyte membrane;

a fuel supplier adapted to supply hydrogen or a fuel to the at least one electricity generating element; and an oxidant supplier adapted to supply an oxidant to the at least one electricity generating element, wherein the first catalyst and the second catalyst are present in a weight ratio ranging from 1:0.02 to 1:0.4.

9. The fuel cell system of claim 8, wherein the Pt and the metal of the first and second catalyst are present in a weight ratio ranging from 1:0.1 to 1:0.5.

10. The fuel cell system of claim 8, wherein the inorganic oxide supporter comprises at least one oxide selected from the group consisting of Al oxide, Si oxide, Zr oxide and Ti oxide.

* * * * *